United States Patent [19]

Kitagawa et al.

[11] Patent Number: 4,766,159

[45] Date of Patent: Aug. 23, 1988

[54] PROCESS FOR PRODUCING POLYPROPYLENE FOAM

[75] Inventors: Sotoyuki Kitagawa; Takashi Nakayama; Masatoshi Isono, all of Kanagawa, Japan

[73] Assignee: Tonen Sekiyukagaku K.K., Tokyo, Japan

[21] Appl. No.: 64,627

[22] Filed: Jun. 22, 1987

[30] Foreign Application Priority Data

Jun. 25, 1986 [JP] Japan ................................ 61-148784

[51] Int. Cl.$^4$ ................................................ C08J 9/06
[52] U.S. Cl. ............................ 521/134; 264/DIG. 17; 264/54; 521/140; 521/143; 521/144; 521/915; 521/51.5
[58] Field of Search ............... 521/143, 144, 134, 915, 521/51.5, 140; 264/54, DIG. 17

[56] References Cited

U.S. PATENT DOCUMENTS

| 3,882,209 | 5/1975 | Yanagisawa et al. | 521/88 |
| 4,154,785 | 5/1979 | Inui et al. | 521/51 |
| 4,303,757 | 12/1981 | Kajimura et al. | 521/60 |
| 4,367,185 | 1/1983 | Nojiri et al. | 521/140 |
| 4,421,867 | 12/1983 | Nojiri et al. | 521/88 |
| 4,424,293 | 1/1984 | Nojiri et al. | 521/88 |

*Primary Examiner*—Morton Foelak
*Attorney, Agent, or Firm*—M. B. Kurtzman

[57] ABSTRACT

The invention relates to the process of the invention provides a radiation-crosslinked polypropylene foam by extrusion at a low temperature (about 170° C.) below the decomposition point of the blowing agent. The resulting foamed item has by far better heat resistance than conventional ones.

The raw resin can be prepared by mixing a resin in the pellet form and a blowing agent in the powder form on account of the low-temperature flowability. Heretofore, such mixing was impossible because the blowing agent does not disperse completely.

This outstanding effect of the invention was not expected at all from the known prior arts.

2 Claims, No Drawings

PROCESS FOR PRODUCING POLYPROPYLENE FOAM

DETAILED DESCRIPTION OF THE INVENTION

1. Field of Industrial Application

This invention relates to an improved process for producing polypropylene foam, and more particularly, it relates to a process for producing radiation-crosslinked polypropylene foam. The foam is useful for example as automotive interior, food containers and as a heat-resistant heat insulation material in the form of composite with a plastic sheet.

2. Prior Arts and Problems Involved Therein

Radiation-crosslinked foams have usage in extremely varied fields on account of their good resilience, efficient production, and economy.

The production of radiation-crosslinked foams involves the steps of mixing the raw material resin with a blowing agent, blowing auxiliary, crosslinking accelerator, etc. at a temperature below the decomposition point of the blowing agent, and molding the mixture into a desired shape. Illustrative of the raw material resin employed are polyvinyl chloride (PVC) and low-density polyethylene (PE) which have a low melting point and a low flow point. The foam obtained from these raw material resins however is poor in heat resistance and consequently limited in applications.

On the other hand, it is known that a foam having improved heat resistance is obtained from polypropylene. By virtue of its good heat resistance and mechanical properties (such as flexural strength), polypropylene has found use in a variety of applications such automotive interior heat insulation material, building material, and packaging material which all need heat resistance and stiffness.

The polypropylene is either homo-polypropylene or block-polypropylene. Having a high melting point in order to obtain a foam, these raw mateials need a blowing agent having a high decomposition point. Such a blowing agent generates only a small amount of gas and has to be used in large amounts. This leads to a high production costs. In addition, it decomposes in the prematured stage and forms irregular fine cells, resulting in poor products.

There is proposed a process for producing a foamed sheet having improved heat resistance from random polypropylene (see Japanese Patent Publication No. 38716/1971). The sheet stock of random polypropylene has good processability (molding and foaming) but the resulting foam sheet does not have satisfactory heat resistance.

Therefore, there has been a strong demand for a polypropylene foam which has good heat resistance and yet is produced from new material having improved in low-temperature flowability which greatly affects the efficiency and cost of resin preparation, molding, and foaming. To be concrete, for satisfactory heat resistance, block-polypropylene or homo-polypropylene having a melting point (about 160° C.) should be used as a raw material and yet they should be improved in low-temperature flowability (below 170° C.).

OBJECT OF THE INVENTION

The present invention was completed in view of the foregoing. Accordingly, it is an object of the present invention to provide a process for producing a polypropylene foam which is superior in both heat resistance and low-temperature flowability and is imparted improved mechanical properties such as resilience.

CONSTITUTION OF THE INVENTION

The above-mentioned object is achieved by producing a radiation-crosslinked polypropylene foam from polypropylene having an MFR of 30-100 said polypropylene being either block-polypropylene containing 1-20 wt % of ethylene component or homo-polypropylene.

The low-temperature flowability of polypropylene can usually be improved by mixing it with about 30-40 wt % of polyethylene having low melting point. However, the object is achieved only at a sacrifice of great decrease in heat resistance.

According to the present invention, the low-temperature flowability of polypropylene is improved not by lowering the melting point but by raising the MFR (melt flow rate, measured according to JIS K7210, at 230° C. under a load of 2.16 kg). The essence for improvement consists in using a block-polypropylene containing 1-20 wt % of ethylene and having an MFR of 30-100 or homo-polypropylene having an MFR of 30-100. This specific polypropylene is capable of extrusion and molding at a temperature lower than the decomposition point (about 170° C.) of a blowing agent.

The specific polypropylene is formed into a sheet or other molded items, which then undergo radiation-crosslinking and foaming. The resulting foam has by far higher heat resistance and stiffness than foams produced from conventional polyethylene and random polypropylene. According to the present invention, the raw resin can be prepared simply by mixing the resin pellets with a blowing agent powder. By contrast, the conventional practice requires that the pellets should be crushed for complete dispersion of a blowing agent.

According to the process of the invention, a low-temperature flowing polypropylene is mixed with a blowing agent and crosslinking auxiliary, the mixture is molded, the molded item undergoes radiation crosslinking, and the crosslinked item is foamed.

The polypropylene having an MFR of 30-100 used in the present invention is block-polypropylene containing 1-20 wt % of ethylene or homo-polypropylene. A proper means may be used to adjust the MFR value to the 30-100 range. The block-polypropylene containing 1-20 wt % of ethylene and having an MFR of 30-100 or homo-polypropylene having an MFR of 30-100 can be produced by normal polymerization processes. It can also be produced by the modification of a block-polypropylene or homo-polypropylene having an MFR lower than 30. This modification may be performed by adding an organic peroxide to a block-polypropylene having an MFR of 1-20 or a homo-polypropylene having an MFR of 1-30, followed by heating. The modification may also be performed by irradiation.

The organic peroxide that can be used is one which has a decomposition point higher than 170° C., e.g., methyl ethyl ketone peroxide, dicumyl peroxide, t-butyl-peroxyisopropyl carbonate, 2,5-dimethyl-2,5-di(t-butyl-peroxy)hexane, and 2,5-dimethyl-2,5-di(t-butyl-peroxy)hexyne-3. It should be added in an amount of 100-600 ppm. The heating temperature for extrusion should be 170°-250° C. The dosage for high-energy irradiation should be 1-100 Mrad.

The low-temperature flowing block-polypropylene containing 1-20 wt % of ethylene component and having an MFR of 30-100 or homo-polypropylene having an MFR of 30-100 may be incorporated with other polyolefin for the purpose of improvement of foamability and moldability. The type and amount of polyolefin to be added should be properly selected in consideration of the desired heat resistance of the crosslinked foam.

For example, for the purpose of improvement of foam-moldability, the polypropylene may be incorporated with 40-60 wt % of random polypropylene. In this case, the MFR should preferably be in a range from 20 to 80.

Any known blowing agent may be added to the low-temperature flowing block-polypropylene or homo-polypropylene. One having a decomposition point of 180°-270° C., which is higher than the melting point of the polypropylene, is preferable. Examples include azodicarbonamide, metal salt of azodicarboxylic acid, and hydrazodicarbonamide.

By virtue of the low-temperature flowing properties, the block-polypropylene or homo-polypropylene should preferably be used in the form of pellets and the blowing agent should preferably be used in the form of powder. The crosslinking auxiliary and other additives may be used in the form of liquid.

When the low-temperature flowing block-polypropylene or homo-polypropylene in the form of pellets is mixed with a blowing agent in the form of powder and a crosslinking agent in the form of liquid, comparatively stringent temperature control is desirable because there is only a small difference (say 5°-10° C.) between the flowing point and the melting point of the raw materials. It is desirable that the extruder used for mixing should be one having an L/D ratio of about 30 and a screw provided with a mixing heat to ensure good dispersion.

The radiation crosslinking after molding may be promoted by the aid of a commonly used crosslinking auxiliary such as acrylate ester, methacrylate ester, or aromatic carboxylate ester of aliphatic or aromatic polyhydric alcohol and vinyl ester of aliphatic or aromatic polycarboxylic acid. Examples include trimethylolpropane trimethacrylate, trimethylolpropane triacrylate, pentaerythritol pentacrylate, diallyl phthalate, and diallyl maleate.

The ionization radiation source for radiation crosslinking may be α-ray, β-ray, and γ-ray. Most preferable among them is β-ray (electron ray).

The dosage of irradiation ranges from 0.1 to 50 Mrad, preferably 1 to 30 Mrad, depending on the type of crosslinking auxiliary used and the desired degree of crosslinking.

The crosslinked resin finally undergoes foaming. Foaming should be performed in a short time at a temperature higher than the melting point of polypropylene, preferably 190° C. and above, and more preferably 230°-260° C., so that the blowing agent decomposes rapidly to produce fine cells.

The invention will be understood more readily by reference to the following examples, however, these examples are intended to illustrate the invention and are not to be construed to limit the scope of the invention. Unless otherwise stated, quantities are expressed as parts by weight.

EXAMPLES 1 TO 5

The raw resin for foam was prepared by mixing in a Henschel mixer 100 parts by weight of block-polypropylene powder (melting point 160° C.) containing 7 wt % of ethylene component and having an MFR of 15, 0.1 parts of heat stabilizer, and a varied amount of peroxide (2,5-dimethjyl-2,5-di(t-butylperoxy)hexane) as shown in Table 1. The resulting mixture was extruded at 230° C. by using a 50-mm extruder. The thus obtained raw resin has an increased MFR value as shown in Table 1.

One hundred parts of the raw resin was mixed with 15 parts of azodicarbonamide and 2 parts of trimethylolpropane trimethacrylate by using a Henschel mixer. The resulting mixture was formed into a sheet, 250 mm wide and 1.5 mm thick, by using a 40-mm extruder at 170° C. or below.

The resulting sheet was found to contain uniformly dispersed blowing agent and was free of rough surface attributable to the decomposition of the blowing agent.

The sheet was irradiated with electron rays from both sides at a dosage of 8 Mrad. The irradiated sheet was put in a bath at 250° C. so that the blowing agent decomposes to effect foaming.

The thus obtained foamed sheet exhibited outstanding heat resistance as shown in Table 2.

COMPARATIVE EXAMPLES 1 AND 2

The sheet molding was carried out in the same way as in Examples 1 to 5 except that the amount of the peroxide (2,5-dimethyl-2,5-di-(t-butylperoxy)hexane) was reduced and the block-polypropylene was replaced by the one having an MFR of 15 or 20. The resulting sheet was found to contain a decomposition gas ascribed to the partial decomposition of the blowing agent and have a rough surface ascribed to the release of the decomposition gas.

COMPARATIVE EXAMPLE 3

The sheet molding was carried out in the same way as in Examples 1 to 5 except that the amount of the peroxide (2,5-dimethyl-2,5-di(t-butylperoxy)hexane) was increased. The resulting sheet was unsatisfactory because of low melt strength.

EXAMPLE 6

Expandable sheet stock (1.5 mm thick and 250 mm wide) was prepared by mixing 100 parts of a 50:50 mixture of raw resin (having an MFR of 30, as obtained in Example 1) and random polypropylene (containing 3 wt % of ethylene and having an MFR of 9), with 15 parts of azodicarbonamide and 2 parts of trimethylolprOpane trimethacrylate. The sheet underwent the same foaming step as in Examples 1 to 5.

The sheet was more readily foamed than that in Examples 1 to 5 on account of the random-polypropylene contained therein. The resulting foam sheet was comparatively good in resistance to heat distortion.

EXAMPLE 7

Expandable sheet stock was prepared under the same condition as in Example 6. The same raw resin (having an MFR of 30) as in Example 1 was mixed with 10 wt % of ethylene-propylene rubber (having an MFR of 4) instead of 50 wt % of random-polypropylene. The sheet underwent the same foaming step as in Example 6.

The sheet was better in foaming performance than that in Examples 1 to 5, and the resulting foam sheet was comparatively good in resistance to heat distortion.

The resulting foamed sheet looked fine externally with uniformly dispersed blowing agent and had very good resistance to heat distortion at 120° C. and 140° C.

TABLE 1

Results of Test on Sheet Molding by Extrusion at a Low Temperature

| Example No. | Base resin | Amount of organic peroxide added (ppm) | MFR of raw resin (g/10 min) | Moldability of foamable sheet Extrusion* temp. (°C.) | Appearance** of sheet |
|---|---|---|---|---|---|
| Comparative Example 1 | Block PP | 0 | 15 | 185 | 3 |
| Comparative Example 2 | Block PP | 60 | 20 | 175 | 3 |
| Example 1 | Block PP | 140 | 30 | 170 | 2 |
| Example 2 | Block PP | 280 | 50 | 165 | 1 |
| Example 3 | Block PP | 370 | 60 | 163 | 1 |
| Example 4 | Block PP | 480 | 80 | 161 | 1 |
| Example 5 | Block PP | 600 | 100 | 160 | 2 |
| Comparative Example 3 | Block PP | 650 | 120 | 160 | 3 |

*Temperature at which extrusion is possible.
**1 Good surface with uniform dispersion of blowing agent.
2 Good surface with uniform dispersion of blowing agent, but slight foaming.
3 Poor sheet molding due to decomposition of blowing agent.

COMPARATIVE EXAMPLES 4 TO 5

Foamed sheets were prepared in the same way as in examples from random-polypropylene (containing 3 wt % of ethylene and having an MFR of 9) and polyethylene (having a density of 0.93 and an MI of 12), respectively.

The resulting foamed sheet had less pinholes than that in Examples 1 to 5, but was extremely poor in resistance to heat distortion. Both foamed sheets suffered more than 10% of distortion after heating at 140° C. for 10 minutes and subsequent standing for 24 hours. Foamed sheet of polyethylene suffered more than 10% of distortion even at 120° C.

Table 1 shows the results of the test on sheet molding by extrusion at a low temperature and Table 2 shows the results of the evaluation on the resistance to heat distortion which were obtained in Examples 1 to 7 and Comparative Examples 1 to 5.

The results of the examples indicate the outstanding low-temperature flowability in the foaming step and the good heat resistance of the foamed item.

EXAMPLE 8

Homo-polypropylene (as a raw resin) having an MFR of 60 was prepared under the same conditions as in Example 1 by mixing 100 parts of homo-polypropylene powder having an MFR of 15 g/10 min, 0.1 parts of the same heat stabilizer as in Example 1, and 370 ppm of the same organic peroxide as in Example 1.

The raw resin was formed into a blowing agent-containing sheet, the sheet was irradiated with electron rays, and the crosslinking sheet underwent the foaming step under the same conditions as in Example 3.

TABLE 2

Result of Evaluation of Resistance to Heat Distortion

| Example No. | Raw resin | Resistance to Heat distortion* 120° C. | 140° C. |
|---|---|---|---|
| Example 1 | | 0 | 1 |
| Example 2 | | 0 | 0 |
| Example 3 | | 0 | 0 |
| Example 4 | | 0 | 0 |
| Example 5 | | 0 | 1 |
| Comparative Example 4 | Random PP (ethylene 3%) MFR 9 | 0 | 3 |
| Comparative Example 5 | Polyethylene (density 0.93) MI 12 | 3 | 3 |
| Example 6 | Block PP/random PP = 50/50 | 0 | 1 |
| Example 7 | Block PP/Toughmer = 90/10 | 0 | 1 |

*Resistance to heat distortion is indicated in terms of the amount of distortion that takes place when the specimen is heated for 10 minutes and subsequently allowed to stand for 24 hours.
0 No change at all.
1 Deformation less than 2%.
2 Deformation of 2 to less than 10%.
3 Deformation more than 10%.

What is claimed is:

1. In a process for the production of polypropylene foam comprising mixing polypropylene with a blowing agent and crosslinking auxiliary, molding the mixture, crosslinking the molded mixture and foaming, the improvement comprising employing a polypropylene selected from homo-polypropylene or block-polypropylene containing 1–20 wt % ethylene and having a MFR in the range of 30–100.

2. The process according to claim 1 wherein the polypropylene further comprises 40–60 wt % random polypropylene.

* * * * *